(12) United States Patent
Hyde et al.

(10) Patent No.: US 12,333,478 B2
(45) Date of Patent: Jun. 17, 2025

(54) LYNKD PORTAL AND ARCHITECTURE

(71) Applicant: RPH Engineering, LLC, Lehi, UT (US)

(72) Inventors: Ryan Hyde, Lehi, UT (US); Jacob Morrise, Lehi, UT (US); Ethan Gibson, Lehi, UT (US); Michael Colton, Lehi, UT (US)

( * ) Notice: Subject to any disclaimer, the term of this patent is extended or adjusted under 35 U.S.C. 154(b) by 411 days.

(21) Appl. No.: 16/286,510

(22) Filed: Feb. 26, 2019

(65) Prior Publication Data

US 2019/0266558 A1 Aug. 29, 2019

Related U.S. Application Data

(60) Provisional application No. 62/635,453, filed on Feb. 26, 2018.

(51) Int. Cl.
| | | |
|---|---|---|
| *G06Q 10/0833* | (2023.01) | |
| *G06K 19/06* | (2006.01) | |
| *G06K 19/07* | (2006.01) | |
| *H04L 9/32* | (2006.01) | |
| *H04L 9/40* | (2022.01) | |

(52) U.S. Cl.
CPC ... *G06Q 10/0833* (2013.01); *G06K 19/06037* (2013.01); *G06K 19/0723* (2013.01); *H04L 9/3231* (2013.01); *H04L 63/102* (2013.01); *H04L 2209/805* (2013.01); *H04L 2209/88* (2013.01)

(58) Field of Classification Search
CPC ......... G06Q 10/0833; G06K 19/06037; G06K 19/0723; H04L 9/3231; H04L 63/102; H04L 2209/805; H04L 2209/88
USPC .......................................................... 705/333
See application file for complete search history.

(56) References Cited

U.S. PATENT DOCUMENTS

| | | | |
|---|---|---|---|
| 9,453,758 B2* | 9/2016 | Motoyama | G01G 19/414 |
| 9,858,738 B2* | 1/2018 | Wilkinson | G07C 9/22 |
| 10,043,151 B1* | 8/2018 | Zhu | G06Q 10/0836 |
| 2014/0258168 A1* | 9/2014 | Crawford | E05G 7/00 |
| | | | 705/339 |
| 2017/0011339 A1* | 1/2017 | Buford | G06Q 10/0835 |
| 2018/0165637 A1* | 6/2018 | Romero | G06Q 10/0833 |
| 2019/0147559 A1* | 5/2019 | Lee | G06Q 50/32 |
| | | | 705/332 |

FOREIGN PATENT DOCUMENTS

JP 2018058656 A * 4/2018

OTHER PUBLICATIONS

English language Abstract and Specification of JP-2018058656-A, published Apr. 2018.*

* cited by examiner

*Primary Examiner* — Daniel A Hess
(74) *Attorney, Agent, or Firm* — Joseph Shapiro; Shapiro IP Law

(57) ABSTRACT

A method and system for employing a technology architecture for solving real world problems.

14 Claims, 1 Drawing Sheet

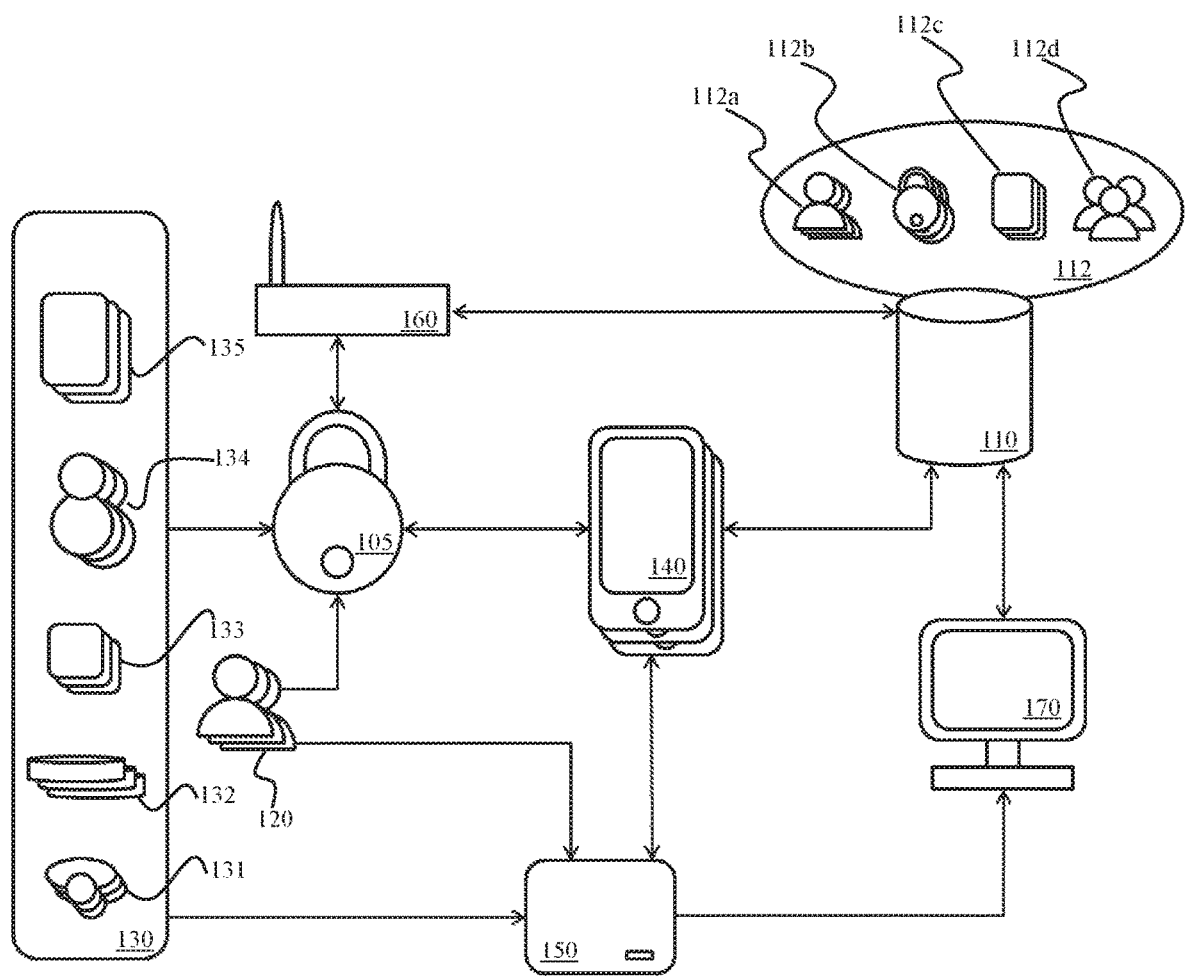

LYNKD PORTAL AND ARCHITECTURE

BACKGROUND

The advent of the internet of things and connected devices has resulted in many improvements. Notwithstanding, many old practices remain unimproved. What is needed is a better way of delivering packages and performing other actions.

BRIEF DESCRIPTION OF THE DRAWINGS

FIG. 1 illustrates an exemplary system as disclosed herein.

DETAILED DESCRIPTION OF THE INVENTION

This Application claims priority to U.S. Provisional Application No. 62/635,453, titled "Lynkd Portal and Architecture," the first inventor of which is Ryan Hyde, which was filed on Feb. 26, 2018, and which is incorporated herein by reference in its entirety.

A system and method are disclosed for employing a technology architecture for for solving real world problems.

TABLE OF REFERENCE NUMBERS FROM DRAWINGS

The following table is for convenience only, and should not be construed to supersede any potentially inconsistent disclosure herein.

| Reference Number | Description |
| --- | --- |
| 100 | exemplary system |
| 105 | connected device |
| 110 | Lynkd Portal/web server |
| 112 | stored data |
| 112a | stored user data |
| 112b | stored connected device data |
| 112c | stored RFID tag data |
| 112d | stored groups data |
| 120 | biometric data/key code |
| 130 | RFID tags |
| 131 | ring RFID tags |
| 132 | wristband RFIG tags |
| 133 | sticker RFID tags |
| 134 | fob RFID tags |
| 135 | card RFID tags |
| 140 | mobile app |
| 150 | data acquisition terminal |
| 160 | local wi-fi router |
| 170 | computer terminal |

Lynkd Portal

The Lynkd Portal is a Web/Cloud Based Server that organizes, stores, and protects Administrator, User, Connected Device and Access Key data. The Lynkd Portal is accessed through a Computer Terminal or Mobile APP and gives an Administrator the ability to configure, access, send data between, and grant or removes access to one or more Connected Devices.

Connected Device

A Connected Device is one of a group of devices, including but not limited to padlocks, doorlocks, deadbolts, lock boxes, etc. that can be connected through the Mobile APP or Computer Terminal to the Lynkd Portal usually through a Wi-Fi, Bluetooth, or Cellular connection.

A Connected Device can be accessed by one or more Access Keys.

A Connected Device stores data including but not limited to password, history log, Access Keys, etc. used in connection with a the Lynkd Portal through a Mobile APP or Computer Terminal.

Mobile App

The Lynkd Mobile APP provides a connection to one or more Connected Devices and can be used to setup, configure, access, receive data to and from, and grant or remove access to a Connected Device or Devices.

The Lynkd Mobile APP acts as the primary gateway to the Lynkd Portal for a Connected Device that does not have Wi-Fi or Cellular access. Data including Access Keys and history log Data can be communicated through either the Administrator's or User's Mobile APP without giving the User access to data that is exchanged.

Computer Terminal

A Computer Terminal is a website or other software that gives access to the Lynkd Portal from a computer or similar device. The Computer Terminal is used to setup and manage Users, Connected Devices, RFID Tags and Group data.

The Computer Terminal can also be used as a payment portal for Administrators and between Users and Administrators.

RFID Tags

An RFID Tag is a device such as a card, FOB, sticker, wristband, ring, Mobile APP, etc. that has an RFID key code that can allow access to a Connected Device. RFID Tags typically have a unique key code for each device. Some RFID Tags are setup to allow an RFID key code to be written to the RFID Tag. RFID tags used in the system may or may not use a battery. The energy to transmit and receive authentication data is provided by the device. Radio wave energy is transmitted from the device, received by the tag. The tag is then energized and echo transmits its unique ID that is received by the device and then processed for access control.

Biometric Data

Biometric Data is User identification such as fingerprints, eye recognition, and facial recognition that can be used to access a Connected Device. Biometric Data and is connected on a Lynkd Portal to a specific User. Biometric Data can be used to grant access to multiple Connected Devices.

Key Code

A Key Code is User identification code such a keypad code, or password that can be used to access a Connected Device. In most cases, Key Codes are connected to a specific user on a Lynkd Portal. Key Codes can be used to grant access to multiple Connected Devices.

Local Wi-Fi Router

A Local Wi-Fi Router is identified as any Wi-Fi connection through which data can be passed between a Connected Device and a Lynkd Portal. This can include Wi-Fi Routers, Hot Spots, Cell Phone connections, etc.

Data Acquisition Terminal

A Data Acquisition Terminal is a device that is capable of collecting Access Key data such as RFID Tag data, Biometric Data, Key Codes, etc. and sending this data either wirelessly though a Mobile APP or through a Computer Terminal to a Lynkd Portal. This data can then be assigned to a User and/or a Connected Device.

Access Key

An Access Key is a device (such as an RFID Tags), Bluetooth or other wireless passcode, or biometric data that can grant access to a Connected Device. Access Keys are often stored in a Lynkd Portal and/or on a specific device.

These keys include but are not limited to RFID Tags, Biometric Data, Passwords, Key Codes or Bluetooth or Cellular Access.

Administrator

An Administrator is a User with control over a Lynkd Portal. An Administrator is able to configure, access, receive, or send data to or from, and grant/remove access or group data to one or more Users and/or Connected Devices.

User

A User has no access, or limited access to a Lynkd Portal. The User is assigned Access Keys, such as RFID Tags, Biometric Data, Bluetooth, or Key Codes, by the Administrator. The users phone or other attributes may act together to form a more secure authentication key. When an Administrator grants access to Connected Devices, the Users is then able to access these Connected Devices. The User loses access to a Connected Device when the Administrator removes their Access Keys.

Setup

Connecting a Connected Device Through the Mobile APP.

A Connected Device is added to a Lynkd Portal through the Mobile APP choosing to add a new Connected Device and powering on the device to make a wireless connection. A secure password can be chosen for each Connected Device. A device on one admin portal also may be shared electronically with a different portal.

Connecting a Connected Device Through a Computer Terminal.

A Connected Device can be added to a Lynkd Portal through a Computer Terminal, by using an access code, QR code, barcode or similar access method that is linked to the Connected Device during manufacturing. By entering this data into the Lynkd Portal through the Computer Terminal, the Connected Device can be added to the Lynkd Portal. For security purposes, this access method can be blocked from future use. The access method can either be block permanently or only while the Connected Device is connected to an existing Lynkd Portal.

Setting Up a Connected Device.

In the process of adding a Connected Device to a Lynkd Portal, it is configured for use. This can be done using either the Mobile APP or a Computer Terminal or by scanning a configuration RFID tag or by pre-programming device firmware to work on a pre-determined wireless system.

When available, the Connected Device is configured for Wi-Fi or Cellular use or other wireless protocol. A Wi-Fi connection is made to a Local Wi-Fi Router by selecting the network and inputting the network password. For some Connected Devices, it may be possible to connect to multiple Wi-Fi networks. This is typically used for Connected Devices that will be moving to different locations so that the Connected Devices can maintain a connection to the Lynkd Portal.

For Connected Devices equipped with a Cellular antenna, a connection is setup with a cellular service. Monthly or Annual rates may apply.

One or more Users can be assigned to a Connected Device. This gives a User access to the Connected Device with one or more Access Keys associated to the User.

One or more RFID Tags can be assigned to a Connected Device. This assignment can be done as part of the User assignment where an Access Key is connected to a specific User, or an Access Key can be assigned to a Connected Device separately and then assigned to a User later or left floating, without a User assignment.

A Connected Device can be assigned to a group of Connected Devices. Changes made to a group are made to each of the Connected Devices in the group. For example, if a User is granted access to a Connected Device group, they are given access to every Connected Device in that group, unless specified otherwise.

A device that is not connected or does not periodically connect itself to a wireless network such as WiFi, may be updated through a secondary connection from "any" user that connect to the device. In this instance a user on the system may connect with the device and in the act of connecting with a device to get authentication himself, may also provide updated portal "User list" information to a device.

Lynkd Portal/APP Setup

A Lynkd Portal can be setup from either a Computer Terminal or the Mobile APP. To setup a Lynkd Portal from a Computer Terminal, the Administrator connects to the Lynkd Website or opens the software. The Administrator will be prompted to enter information to setup the account. After setting up the Lynkd Portal, the Administrator is directed to download and connect to the Mobile APP. o A Lynkd Portal can also be setup from the Mobile APP. The same information will be asked when setting up a Lynkd Portal from the Mobile APP as from the Computer Terminal. Once the account is setup, the Administrator will have access the account, with the same credentials, using either the Mobile APP or Computer Terminal.

Data Acquisition Terminal Setup

Setting up a Data Acquisition Terminal can be done on either a Computer Terminal where a wired or a wireless connection may be used, or on the Mobile APP.

Connection

Updating Access Keys, Configuration Changes and Other Data Between a Connected Device and the Lynkd Portal.

When a Connected Device is powered on, which may be necessary to access the lock, a Wi-Fi or Cellular or RFID Connection is made. Where possible, during this connection, the Lynkd Portal sends updated Access Keys to the Connected Device, this action may be required before access to the lock is allowed. Other data, including configuration data and history log data is exchanged between the Connected Device and the Lynkd Portal before the connection is broken. When Access Keys are updated, configuration changes are made, and for other data changes on the Lynkd Portal, changes are only sent to the Connected Device when a connection is made to the Connected Device. This connection is made when the Connected Device is either manually powered on, or during a periodic check in with the Lynkd Portal.

Configuring and Accessing a Connected Device without Wi-Fi or Cellular Connection.

For Connected Devices that do not have Wi-Fi or Cellular hardware, or are not able to make a Wi-Fi or Cellular connection, connection to the Lynkd Portal can be made through a Mobile APP's data connection. Data is stored on the Connected Device or in the Lynkd Portal until a Wi-Fi or Cellular Connection is made, or until the Connected Device makes a connection with a Mobile APP that has an internet connection, at which point, data is transfer between the Connected Device and the Lynkd Portal. Data can be exchanged between a Connected Device and Lynkd Portal when connected to a Data Connected Mobile APP for either an Administrator or a User. Data sent through this connection may be encrypted so that it is not accessible by the User. The User's Mobile APP acts as a portal o transact the data between the portal and device.

Features

Low Power Mode.

To conserve power and enable Connected Devices to last for an extended period of time, many Connected Devices are designed with a Low Power Mode. In Low Power Mode, the User must first press a button on the Connected Device to wake the device. The device can then make a connection to the Mobile APP and Lynkd Portal. The required button press when "within touching distance" of a device may be used as a architectural requirement to prevent remote hacking of devices. The devices wireless range may be determined by the aperture or hole a wireless signal passes through. The Connected Device may also wake periodically to make a connection and check in with the Lynkd Portal. During this connection period data can be exchange between the Connected Device and the Lynkd Portal.

Heart Beat Function.

•Connected Devices with a Wi-Fi or Cellular or other wireless connection may include a heartbeat function. The heartbeat function in conjunction with a schedule for wake keeps track of the status of the Connected Device and can let the Administrator know if there is a problem with the Connected Device with periodic check ins. The Connected Device periodically makes a Wi-Fi or Cellular connection with the Lynkd Portal. This connection is used both as a check in and as an opportunity for data transfer and to ensure that there are no problems with the Connected Device. If the Connected Device loses battery power, gets broken, or goes out of range of the Wi-Fi or Cellular connection, no check in will occur. An alert can be sent to the Administrator to indicate that there is something wrong with the Connected Device when it misses one or more check ins. The HeartBeat timing or wireless scheduled wake can be set to optimize specifically required security levels for many types of situations. Auto wake by a motion or other type of sensor built into the device can be used to immediately send wireless notifications.

Encryption.

Data may be encrypted before being transferred. This included transfers between a Connected Device and the Lynkd Portal, between a Connected Device and a Mobile APP, between a Mobile APP and the Lynkd Portal, from a Data Acquisition Terminal to a Mobile APP, from a Data Acquisition Terminal to a Computer Terminal, and Between a Computer Terminal and The Lynkd Portal.

Alerts/Notifications.

The Lynkd Architecture allows Alert Notifications to be sent to an Administrator. Alerts can be triggered from activity including, but not limited to, motion, accelerometer data, temperature, water, unauthorized access, low battery levels, light, sound, etc. When an Alert is triggered, a connection is made between the Connected Device and the Lynkd Portal to indicate the problem. A notification can then be sent out to the Administrator. This notification can be sent through app notification, text message, email, voice call, or some other method.

Audible Alarms.

Many of the Connected Devices are also designed with an audible alarm, which can be configured to sound when specific alerts are triggered.

Multiple Access Options.

A Connected Device includes one or more of the following access options: RFID Tags including but not limited to cards, fobs, sticker, wristbands, rings, etc.; biometric data including but not limited to fingerprints, eye recognition, facial recognition; key codes, Bluetooth, wi-fi, cellular.

Close Proximity Configuration.

A Connected Devices can require that setup and configuration is done through a close proximity connection, such as a Bluetooth connection. This provides extra security for the Connected Device.

Alternate Setups

Lite Mode.

A User and a Connected Device are not required to be connected to the Lynkd Portal. This is known as Lite Mode or Lite Use. In Lite Mode, the Mobile APP acts as a basic Lynkd Portal and is used to configure, access, receive or send data to or from, and grant or remove access to one or more Connected Devices. In lite mode, all data is stored on the Mobile APP and/or Connected Device. No data is sent through Wi-Fi or Cellular transmission to a Lynkd Portal.

Rental/Purchase Portal.

A Lynkd Portal can be setup as a rental/purchase portal. This gives the Administrator the ability to setup a Connected Device as a rental device. For example, a snow board could be accessed from a cage locked by a Connected Padlock. Using the rental/purchase portal, a new User can be added to a Lynkd Portal by entering information. They will then be given access the property, once payment is made or an agreement is made for that rental or purchase. The Lynkd Portal would charge this User based on the parameters setup by the administrator.

Business Member Access

In one embodiment, a business or other enterprise or location may include a store front, show room, office, storage, exercise, and/or other facility (-ies) that may not have onsite personnel to grant access to, authorized individuals, e.g., company personnel, customers, distributors, etc. Using the architecture disclosed herein, an authorized individual may be able to access the business/facility at any time (e.g., during business hours, after business hours, or other times specified by the business)—even when no representative is physically on the premises to grant access.

A member or other authorized individual may set up an access account using the Lynkd portal either through the business or by directly setting up an account. The access account may be set up from an app or by connecting to the Lynkd portal with a URL, QR code, onsite terminal, etc.

Once an access account has been approved, the user (e.g., member or authorized individual) will have access to the facility. This access may be through the app, RFID tags, bluetooth, web portal, key code, fingerprint, facial recognition, or other access method. The facility may be secured with locks, alarms, etc. to prevent unauthorized access. Access data (e.g., time, facility, user identity) may be stored to the business's database, to the Lynkd Portal, or to another data storage solution. Alarms/notifications can also be set up to give the business/facility immediate notification when the business/facility is accessed, or has not been properly secured, or other circumstances that may merits one or more alarms or notifications.

Package Delivery

In one embodiment, a user may use a secure connected device to secure a package being delivered to a home, business, or other location. The user may be, but is not limited to, a private individual, an individual acting on behalf of a business or other enterprise, another type of user, or a business or other entity. The secure connected device may comprise a padlock, lock box, doorlock, or for securing one or more items or contents, and/or for securing a space. The secured connected device may connect to and communicate with the Lynkd System through Wi-Fi, Bluetooth, wireless or wired communication protocols to facilitate access to the user or other authorized individual.

In one embodiment, a package may be delivered and secured by the secured connected device. Delivery information may be sent to a user or other authorized individual. Additionally, alarms and/or notifications may be used to provide to a user or other authorized individual notification of access to the secured connected device, attempted access to the secured connected device, other that the secured connected device has not been properly secured or is otherwise compromised, or of any other information or event that may merit notification.

A user, e.g., an authorized individual, may set up an access account using the Lynkd Portal through a business, app, or by connecting the Lynkd Portal using a URL, QR code, onsite terminal, or other technology for receiving and/or transmitting data to or from the Lynkd Portal. The Lynkd Portal may approve an access account for the user and grant access to the secured connected device. Such access may be through a mobile app, RFID tag(s), Bluetooth, web portal, key code, fingerprint, facial recognition, other biological feature, or any other access method known or available in the art.

The Lynkd Portal may receive shipment information, e.g., from a merchant or shipper website or database or system, or entered manually, or from any other system for transmitting shipping/tracking information. The shipment information may include a tracking number.

A delivery agent may be granted access, e.g., by the Lynkd Portal, to use the secured connected to secure a package or other item. The granted access may comprise, e.g., an identification code such as a package tracking number, an RFID tag, a mobile app, a Bluetooth code, a fingerprint or other biometric feature.

Once a package or item has been delivered, a message may be sent to the Lynkd Portal. The message may include package details, date and/or time of delivery or other event, status of the associated secured connected device, and/or other information relating to delivery of the package. The Lynkd Portal may then notify a user of delivery, status information (e.g., secured connected device is secured or unsecured), location of package, time and date of delivery, and other information relating to the delivery. In one embodiment, the secured connected device may include a camera that may be used to collect and/or transmit to a user, e.g., through Lynkd Portal, images and/or information about package delivery, identity of individual(s) delivering or otherwise handling package, weather or other conditions, or any other information that may be collected in whole or in part using a camera.

The secured connected device may also collect and transmit tamper, temperature, sound, vibration, and other information that may be provided as, e.g., a notification to a user or other individual or party with an interest in the status of a package.

Gun/Firearm Storage

In one embodiment, a user may use a secure connected device to secure a firearm The secure connected device may comprise a padlock, lock box, doorlock, or for securing one or more firearms, or for securing a space containing one or more firearms. The secured connected device may connect to and communicate with the Lynkd System through Wi-Fi, Bluetooth, wireless or wired communication protocols to facilitate access to the user or other authorized individual.

Alarms and/or notifications may be used to provide to a user or other authorized individual timely notification of access to the secured connected device, attempted access to the secured connected device, other that the secured connected device has not been properly secured or is otherwise compromised, or of any other information or event that may merit notification.

A user, e.g., an authorized individual, may set up an access account using the Lynkd Portal through a business, app, or by connecting the Lynkd Portal using a URL, QR code, onsite terminal, or other technology for receiving and/or transmitting data to or from the Lynkd Portal. The Lynkd Portal may approve an access account for the user and grant access to the secured connected device. Such access may be through a mobile app, RFID tag(s), Bluetooth, web portal, key code, fingerprint, facial recognition, other biometric feature, or any other access method known or available in the art.

In addition to having access to the secure connected device, and one or more firearms secured by the secure connected device, the user may secure a firearm using the secure connected device.

The secured connected device may also collect and transmit tamper, temperature, sound, vibration, and other information that may be provided as, e.g., a notification to a user or other individual or party with an interest in the status of a firearm and/or secure connected device.

Rentals

In one embodiment, a business or other enterprise or location may include a store front, show room, office, storage, exercise, and/or other facility (-ies) that may not have onsite personnel to grant access to items for rent or otherwise for temporary and/or restricted use. Using the architecture disclosed herein, an authorized individual may be able to access the business/facility at any time (e.g., during business hours, after business hours, or other times specified by the business)—even when no representative is physically on the premises to grant access.

A member or other authorized individual may set up an access account using the Lynkd portal either through the business or by directly setting up an account. The access account may be set up from an app or by connecting to the Lynkd portal with a URL, QR code, onsite terminal, etc.

Once an access account has been approved, the user (e.g., member or authorized individual) may have access to available rental items, which may be secured with secure connected devices (e.g., locks, alarms, etc.) to prevent unauthorized use. Rental/use/access data (e.g., time, facility, user identity) may be stored to the business's database, to the Lynkd Portal, or to another data storage solution. Alarms/notifications can also be set up to give the business/facility immediate notification when the rental items are accessed, or have not been properly secured, or other circumstances that may merits one or more alarms or notifications.

Lock-Out Tag-Out

Storage Units

In one embodiment, a storage unit business may not have onsite personnel to grant access to customers and/or other authorized individuals to storage units. Using the architecture disclosed herein, a customer or authorized individual may be able to access a storage unit at any time, and for any period of time-even when no representative is physically on the premises to grant access.

A customer or other authorized individual may set up an access account using the Lynkd portal either through the business or by directly setting up an account. The access account may be set up from an app or by connecting to the Lynkd portal with a URL, QR code, onsite terminal, etc.

Once an access account has been approved, the customer or other authorized individual may have access to one or more storage units for a period of time. This access may be through a mobile app, RFID tags, bluetooth, web portal, key code, fingerprint, facial recognition, other biometric, or other access method. The storage units facility may be secured with locks, alarms, etc. to prevent unauthorized access. Access data (e.g., time, facility, user identity) may be stored to the business's database, to the Lynkd Portal, or to another data storage solution. Alarms/notifications can also be set up to give the business/facility immediate notification when a storage unit is accessed, or has not been properly secured, or other circumstances that may merits one or more alarms or notifications.

Notifications

Medical/Corporate Compliance

In one embodiment, a business, e.g., a medical business, or other enterprise or location may grant access to employees for facilities and/or equipment, and an employee may then have access at limited times selected by business management-even when no representative or agent is physically on the premises to grant access.

An employee may set up an access account using the Lynkd portal either through the business or by directly setting up an account. The access account may be set up from an app or by connecting to the Lynkd portal with a URL, QR code, onsite terminal, etc.

Once an access account has been approved, the employee (e.g., member or authorized individual) may have access to facilities, equipment, and/or items, which may be secured with secure connected devices (e.g., locks, alarms, etc.) to prevent unauthorized use. Use/access data (e.g., time, facility, user identity) may be stored to the business's database, to the Lynkd Portal, or to another data storage solution. Alarms/notifications can also be set up to give the business/facility immediate notification when the rental items are accessed, or have not been properly secured, or other circumstances that may merits one or more alarms or notifications.

Security Alarm

In one embodiment, a user may use a connected alarm device to send out alarms based on trigger events or trigger conditions. A connected alarm device may connect to, receive information from, and/or transmit information to, the Lynkd Portal via Wi-Fi, Bluetooth, or any other wireless, wired, or other communication technology known in the art. The Lynkd Portal may transmit an instruction or notification to a phone, intercom, light, siren, or other device to convey an alert message or condition.

A user may set up an access account using the Lynkd portal either through the business or by directly setting up an account. The access account may be set up from an app or by connecting to the Lynkd portal with a URL, QR code, onsite terminal, etc.

The user may then use an interface, e.g., a mobile app, to set up trigger events and/or conditions for an alarm, and to further set up alert devices for a trigger condition. An alert device may include, but is not limited to, a phone, intercom, light, siren, or other device to convey an alert message or condition.

When a configured connected alarm device detects a trigger event or condition, the configured connected alarm device may transmit a notification of the alarm condition to the Lynkd Portal and/or recipient devices.

A trigger event or condition may include, e.g, tampering, temperature, sound, vibration, motion, light, water, and any other trigger event or condition.

Medical Alert

In one embodiment, a user may use a connected alert device to send out alerts based on trigger events or trigger conditions that may include medical conditions. A connected alert device may be, e.g., a wearable push button. A connected alarm device may connect to, receive information from, and/or transmit information to, the Lynkd Portal via Wi-Fi, Bluetooth, or any other wireless, wired, or other communication technology known in the art. The Lynkd Portal may transmit an instruction or notification to a phone, intercom, light, siren, or other device to convey an alert message or condition.

A user may set up an access account using the Lynkd portal either through the business or by directly setting up an account. The access account may be set up from an app or by connecting to the Lynkd portal with a URL, QR code, onsite terminal, etc.

The user may then use an interface, e.g., a mobile app, to set up trigger events and/or conditions for an alarm, and to further set up devices for a trigger condition. A device for a trigger event or condition may include, but is not limited to, a phone, intercom, light, siren, or other device to convey an alert message or condition. Such devices may be selected based on telephone number, address, email address, mobile number, or any other identifying information. A user may further set up an alert notification message to be transmitted to a recipient, e.g., the owner or possessor a device for notifications, when an alert event or condition is triggered.

When a configured connected alert device detects a trigger event or condition, the configured connected alert device may transmit a notification of the alarm condition to the Lynkd Portal and/or recipient devices.

A trigger event or condition may include, e.g, tampering, temperature, sound, vibration, motion, light, water, and any other trigger event or condition.

Time Keeping

In one embodiment, a business may use a connected device track employee time. A connected device may connect to, receive information from, and/or transmit information to, the Lynkd Portal via Wi-Fi, Bluetooth, or any other wireless, wired, or other communication technology known in the art. The connected device may be configured to facilitate clocking in and out by an employee, or for tracking other employee time information.

An employee user may set up an access account using the Lynkd portal either through the business or by directly setting up an account. The access account may be set up from an app or by connecting to the Lynkd portal with a URL, QR code, onsite terminal, etc.

Once an access account has been approved, the employee may clock in and clock out using an app, RFID tags, bluetooth, web portal, key code, fingerprint, facial recognition, other biometric, or other access method. The connected device may transmit the time information to the Lynkd Portal.

The connected device may also collect and transmit tamper, outside-of-expected-time and other notifications to the Lynkd Portal, which may transmit such messages, or information based on such messages, to the business or other interested party.

What is claimed is:

1. An apparatus, comprising:
a connected device having both a lock/no-access state and an unlock/access state;
wherein:
the connected device is battery-powered;
the connected device comprises hardware and software for wireless communication;
the connected device includes on-device storage configured to store an access key set comprising at least one access key;
the connected device is configured to transition from the lock/no-access state to the unlock/access state when a presented access key matches at least one access key in the access key set; and
the connected device includes at least one feature from the following list of features:
the connected device is configured to receive an updated access key set via a close-proximity wireless communication technology, wherein the updated access key set comprises at least two access keys;
the connected device is configured to wirelessly receive heartbeat updates of configuration information, wherein a heartbeat update comprises transitioning a wireless communication protocol from an off state to an on state, receiving updates of configuration information while in the on state, and then transitioning the wireless communication protocol to the off state; and
the connected device includes on-device storage configured to store a log of unlock/access events.

2. The apparatus of claim 1, wherein the connected device includes all of the following features:
the connected device is configured to receive an updated access key set via a close-proximity wireless communication technology, wherein the updated access key set comprises at least two access keys;
the connected device is configured to wirelessly receive heartbeat updates of configuration information, wherein a heartbeat update comprises transitioning a wireless communication protocol from an off state to an on state, receiving updates of configuration information while in the on state, and then transitioning the wireless communication protocol to the off state; and
the connected device includes on-device storage configured to store a log of unlock/access events.

3. The apparatus of claim 1, wherein the connected device is a padlock.

4. The apparatus of claim 1, wherein the connected device is a lockbox.

5. The apparatus of claim 1, wherein the connected device includes on-device storage configured to store a log of unlock/access events and lock/no-access events.

6. The apparatus of claim 1, wherein:
the connected device is configured to receive an updated access key set via a close-proximity wireless communication technology; and
the close-proximity wireless communication technology is Bluetooth.

7. The apparatus of claim 1, wherein:
the connected device is configured to wirelessly receive heartbeat updates of configuration information, wherein a heartbeat update comprises transitioning a wireless communication protocol from an off state to an on state, receiving updates of configuration information while in the on state, and then transitioning the wireless communication protocol to the off state; and
the configuration information comprises an updated access key set.

8. The apparatus of claim 1, wherein the connected device is configured to wirelessly receive adjustable frequency heartbeat updates of configuration information.

9. The apparatus of claim 1, wherein the lock/no-access state is a lock state.

10. The apparatus of claim 1, wherein the lock/no-access state is a state in which access to a physical item is prevented.

11. The apparatus of claim 1, wherein the unlock/access state is an unlock state.

12. The apparatus of claim 1, wherein the unlock/access state is a state in which access to the physical item is allowed.

13. The apparatus of claim 1, wherein the connected device is configured to wirelessly receive heartbeat updates of configuration information over WiFi.

14. An apparatus, comprising:
a lock having both a lock state and an unlock state;
wherein:
the padlock comprises hardware and software for wireless communication;
the padlock includes on-device storage configured to store an access key set comprising at least one access key;
the padlock is configured to transition from the lock state to the unlock state when a presented access key matches at least one access key in the access key set;
the padlock is configured to receive an updated access key set via Bluetooth, wherein the updated access key set comprises at least two access keys;
the padlock is configured to wirelessly receive heartbeat updates of configuration information, wherein a heartbeat update comprises transitioning a wireless communication protocol from an off state to an on state, receiving updates of configuration information while in the on state, and then transitioning the wireless communication protocol to the off state; and
the padlock includes on-device storage configured to store a log of unlock events.

* * * * *